(12) United States Patent
Ma et al.

(10) Patent No.: US 11,349,286 B2
(45) Date of Patent: May 31, 2022

(54) ELECTRIC POWER TRANSMISSION CARRIER, MANUFACTURING PROCESS THEREOF AND ENCLOSURE

(71) Applicant: BEIJING GOLDWIND SCIENCE & CREATION WINDPOWER EQUIPMENT CO., LTD., Beijing (CN)

(72) Inventors: Shengjun Ma, Beijing (CN); Wanshun Ma, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 522 days.

(21) Appl. No.: 15/776,172

(22) PCT Filed: Aug. 24, 2017

(86) PCT No.: PCT/CN2017/098833
§ 371 (c)(1),
(2) Date: May 15, 2018

(87) PCT Pub. No.: WO2018/072553
PCT Pub. Date: Apr. 26, 2018

(65) Prior Publication Data
US 2020/0259317 A1    Aug. 13, 2020

(30) Foreign Application Priority Data

Oct. 18, 2016  (CN) .......................... 201610906920.9

(51) Int. Cl.
*H02G 3/03* (2006.01)
*F03D 80/80* (2016.01)
*H02G 3/04* (2006.01)

(52) U.S. Cl.
CPC ............... *H02G 3/03* (2013.01); *F03D 80/85* (2016.05); *H02G 3/045* (2013.01)

(58) Field of Classification Search
CPC ........... F30D 80/85; H02G 3/045; H02G 3/03
See application file for complete search history.

(56) References Cited

U.S. PATENT DOCUMENTS 3,798,346 A * 3/1974 Kreuzer ............... H02G 3/0412
174/15.6
8,227,932 B2 * 7/2012 Murata ................... F03D 13/20
290/55

(Continued)

FOREIGN PATENT DOCUMENTS

CN      202374614 U      8/2012
CN      204244631 U *    4/2015
(Continued)

OTHER PUBLICATIONS

First Australian Office Action dated Nov. 5, 2018; Appln. No. 2017346069.

(Continued)

*Primary Examiner* — William H. Mayo, III
*Assistant Examiner* — Rhadames Alonzo Miller

(57) ABSTRACT

An electric power transmission carrier and a manufacturing method of the electric power transmission carrier and an enclosure are provided. The electric power transmission carrier includes an enclosure and an electric power transmission cable mounted on the enclosure. The electric power transmission cable is in direct or indirect surface contact with an inner wall of the enclosure, and the enclosure functions as a heat sink of the electric power transmission cable. In the present application, the electric power transmission cable or the conductor is mounted on the enclosure such as a tower barrel or a high tower, to perform electric power transmission and take the enclosure as a heat sink.

(Continued)

The electric power transmission component takes the enclosure, the "heat sink" having a huge thermal capacity, as a "cold source".

9 Claims, 12 Drawing Sheets

(56) References Cited

U.S. PATENT DOCUMENTS

| | | | | |
|---|---|---|---|---|
| 8,319,362 | B2* | 11/2012 | Vihriala | F03D 80/60 290/44 |
| 2004/0169771 | A1* | 9/2004 | Washington | H04N 5/2251 348/374 |
| 2004/0206530 | A1* | 10/2004 | Mitchell | H02G 3/0481 174/547 |
| 2006/0144612 | A1* | 7/2006 | Johansson | B60R 16/0215 174/95 |
| 2006/0199411 | A1* | 9/2006 | Singh | H01R 13/625 439/314 |
| 2009/0045628 | A1* | 2/2009 | Erdman | F03D 9/25 290/44 |
| 2009/0095505 | A1* | 4/2009 | Hagbrandt | H02G 3/03 174/136 |
| 2010/0006710 | A1* | 1/2010 | Lyness | F03D 80/85 248/70 |
| 2010/0134975 | A1* | 6/2010 | Shimizu | H05K 7/202 361/694 |
| 2010/0247326 | A1* | 9/2010 | Prebio | F03D 80/85 416/244 R |
| 2011/0162865 | A1* | 7/2011 | Ueno | F03D 80/85 174/79 |
| 2011/0240341 | A1* | 10/2011 | Lipiansky | H02G 3/32 174/135 |
| 2012/0047840 | A1* | 3/2012 | Gregor | E04H 12/04 52/651.01 |
| 2012/0186845 | A1* | 7/2012 | Eshima | H02G 3/03 174/15.6 |
| 2013/0120102 | A1* | 5/2013 | Barna | A62C 37/36 337/298 |
| 2013/0214538 | A1* | 8/2013 | Himmelmann | F03D 80/85 290/55 |
| 2013/0269999 | A1* | 10/2013 | Cortes Rico | H05K 5/0213 174/547 |
| 2013/0277038 | A1* | 10/2013 | Hyde | F28F 1/12 165/287 |
| 2013/0279116 | A1* | 10/2013 | Murphy | H05K 7/209 361/701 |
| 2014/0217741 | A1* | 8/2014 | Christensen | F03D 80/85 290/55 |
| 2014/0235449 | A1* | 8/2014 | Marzahn | H02G 3/03 505/163 |
| 2014/0326716 | A1* | 11/2014 | Schwenk | H02G 3/03 219/632 |
| 2014/0367135 | A1* | 12/2014 | Christianson | H02G 3/03 174/19 |
| 2015/0068784 | A1* | 3/2015 | Alefelder | F03D 80/85 174/16.2 |
| 2015/0144745 | A1* | 5/2015 | Sims | H02B 11/26 248/56 |
| 2015/0194366 | A1* | 7/2015 | Jeong | H01L 23/3737 257/712 |
| 2015/0216078 | A1* | 7/2015 | Edmundsson | H05K 7/20309 361/691 |
| 2015/0255967 | A1* | 9/2015 | Pawluk | H02B 1/20 174/16.1 |
| 2016/0097326 | A1* | 4/2016 | Williams | F01D 25/28 60/785 |
| 2016/0164270 | A1* | 6/2016 | Sims | F16L 3/12 174/50 |
| 2017/0063298 | A1* | 3/2017 | Lv | H02G 3/081 |
| 2017/0077687 | A1* | 3/2017 | Soerensen | F03D 9/257 |
| 2017/0080881 | A1* | 3/2017 | Ooi | H05K 7/20418 |
| 2017/0279253 | A1* | 9/2017 | Fritz | H02B 1/56 |
| 2017/0290195 | A1* | 10/2017 | Jansen | H05K 7/20209 |
| 2018/0048135 | A1* | 2/2018 | Ma | F03D 13/20 |
| 2018/0306532 | A1* | 10/2018 | Ma | F24S 70/20 |
| 2020/0045846 | A1* | 2/2020 | De Jaegere | H02G 3/16 |

FOREIGN PATENT DOCUMENTS

| | | |
|---|---|---|
| CN | 204244631 U | 4/2015 |
| CN | 104766845 A | 7/2015 |
| CN | 105098670 A | 11/2015 |
| CN | 106410706 A | 2/2017 |
| DE | 102006052815 A1 | 5/2008 |
| EP | 3258559 A1 | 12/2017 |
| JP | 2004-281181 A | 10/2004 |
| JP | 2005-065445 A | 3/2005 |
| WO | 2016049941 A1 | 4/2016 |

OTHER PUBLICATIONS

Extended European Search Report dated Mar. 6, 2019, Appln. No. 17861837.7.

International Search Report dated Nov. 28, 2017; PCT/CN2017/098833.

Korean Office Action dated Jun. 19, 2019; Appln. No. 10-2018-7016117.

* cited by examiner

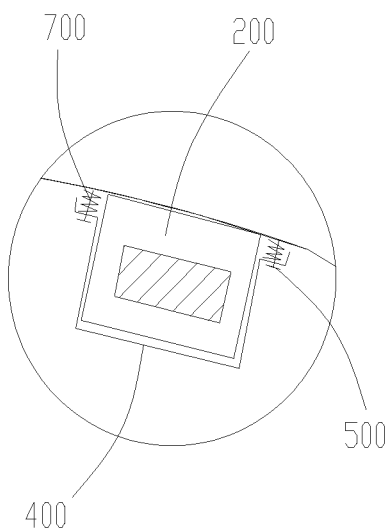
Figure 4-2
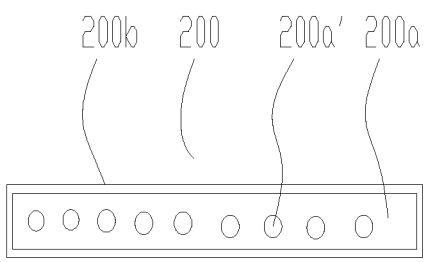 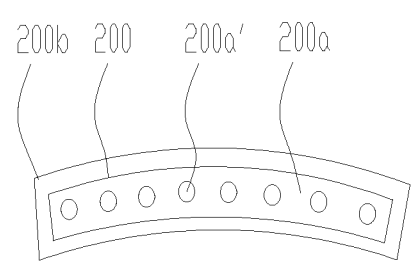
Figure 4-3 Figure 4-4
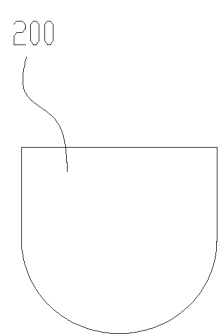 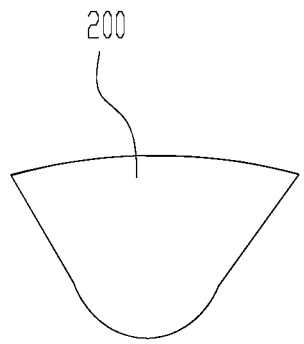
Figure 4-5 Figure 4-6

ELECTRIC POWER TRANSMISSION CARRIER, MANUFACTURING PROCESS THEREOF AND ENCLOSURE

This application is the national phase of International Application No. PCT/CN2017/098833, titled "ELECTRIC POWER TRANSMISSION CARRIER, MANUFACTURING PROCESS THEREOF AND ENCLOSURE", filed on Aug. 24, 2017, which claims the benefit of priority to Chinese Patent Application No. 201610906920.9, titled "ELECTRIC POWER TRANSMISSION CARRIER, MANUFACTURING PROCESS THEREOF AND ENCLOSURE", filed with the State Intellectual Property Office of People's Republic of China on Oct. 18, 2016, the entire disclosures thereof are incorporated herein by reference.

FIELD

The present application relates to the field of heat dissipation technology, and in particular to an electric power transmission carrier, a manufacturing process of the electric power transmission carrier and an enclosure.

BACKGROUND

Reference is made to FIG. 1-1, which is a schematic structural view of a tower in the conventional technology, showing cables inside the tower.

As can be seen from the above figure, lots of cables 30 are laid inside the tower, and the cables 30 extend from a switch cabinet of a generator to pass through a base platform via the bottom of a nacelle and then enter into a reference plane at the top of the tower. A nacelle 20 and the interior thereof have a yaw movement, causing that the cables 30 also have a reciprocating twisting movement. Therefore, a saddle-shaped bracket is arranged inside the tower, and the parts, below the saddle-shaped bracket, of the cables are hanging down near the tower wall 10 in groups and are fixed, and are in a substantially vertical state as a whole.

Reference is made to FIGS. 1-2 and 1-3, FIG. 1-2 is a schematic diagram of the composition of a resulting temperature outside a tower in summer in the conventional technology, and FIG. 1-3 shows resulting temperatures of the tower in the conventional technology in different orientations. FIG. 1-2 and FIG. 1-3 are each obtained by taking a practical tower within the territory of China in Northern Hemisphere as a monitoring object.

In FIG. 1-2, the resulting temperature of the tower is formed by a combined effect of solar radiation and ambient air temperature, that is, a curve 1 (indicating the resulting temperature outside the tower) is formed by superposing a curve 2 (indicating the temperature of air outside the tower) on a curve 3 (indicating an equivalent temperature of solar radiation).

In FIG. 1-3, a curve 1 indicates a resulting temperature of a horizontal direction of the tower (i.e., the temperature of the top of the tower), a curve 2 indicates a resulting temperature of an east vertical side of the tower, and a curve 3 indicates a resulting temperature of a west vertical side of the tower.

The above figures reflect:

1. The resulting temperature of the top of the nacelle is constantly higher than the resulting temperatures of the east vertical side and the west vertical side of each of the enclosures such as the tower and the nacelle 2 from 8 o'clock to 14 o'clock, and by taking 12 o'clock as a symmetry point, an exterior environment of the top of the nacelle 20 is continuously in an environment with a high resulting temperature.

2. For each of the enclosures such as the tower and the nacelle 20, the temperature at the west vertical side is higher than the temperature at the east vertical side after 8 hours.

3. After the west vertical side reaches the maximum temperature value at 16 o'clock, the temperature wave will be transferred to inner surfaces of the tower and the nacelle 20 after a delay of about half an hour; and the duration of the delay is related to a heat storage coefficient of a coating material of the tower and the nacelle and materials of the tower and the nacelle, and the magnitude of the heat storage coefficient corresponds to the duration of the delay of high temperature being transferred into the enclosure. In summer of Hami area at the southern slope of the Tianshan mountains in Sinkiang, the geographical position of Hami area determines that wind frequently blows after 18 o'clock, such that the wind power generator set keeps generating electricity at full power till dawn of the next morning. This means that the heat generated by the heat sources inside the wind power generator set continues to increase, and the falling of the external environment temperature does not immediately influence the internal environment temperature of the generator set.

In other words, the inside of the tower is always in a high temperature state, especially in summer, and in this case, the excessively high internal temperature causes the power transmission cables 30 to be difficult to dissipate heat, and the temperature of the power transmission cables 30 may even become higher, which adversely affects the service life of the power transmission cables and the safety of the entire power transmission system.

SUMMARY

In order to address the above technical issues, an electric power transmission carrier, a manufacturing process of the electric power transmission carrier and an enclosure are provided according to the present application, to allow the electric power transmission component to exchange heat with the enclosure more efficiently, to improve the heat dissipation efficiency.

An electric power transmission carrier is provided according to the present application, which includes an enclosure and an electric power transmission cable mounted on the enclosure. The electric power transmission cable is in direct or indirect surface contact with an inner wall of the enclosure, and the enclosure functions as a heat sink for the electric power transmission cable.

Optionally, a thermal conductive bridge is provided between the electric power transmission cable and the enclosure, the electric power transmission cable is in surface contact with the thermal conductive bridge, and the thermal conductive bridge is in surface contact with the inner wall of the enclosure, to allow the electric power transmission cable to be in indirect surface contact with the enclosure.

Optionally, the electric power transmission cable is tightly bonded to the enclosure by an adhesive layer, and the adhesive layer forms the thermal conductive bridge.

Optionally, the thermal conductive bridge is fixed to the inner wall of the enclosure or preformed on the inner wall of the enclosure.

Optionally, the thermal conductive bridge has a connecting surface connected to the inner wall of the enclosure, and a thermal conductive arc surface configured to mount the electric power transmission cable; or, the thermal conductive bridge is an arc-shaped thermal conductive recess extending from the inner wall of the enclosure; or, the thermal conductive bridge has a connection surface connected to the inner wall of the enclosure, and a thermal conductive arc surface configured to mount the electric power transmission cable, and a part of an arc surface of the electric power transmission cable is bonded to the thermal conductive arc surface by an adhesive layer; or, the thermal conductive bridge includes an arc-shaped thermal conductive recess extending from the inner wall of the enclosure and a thermal conductive adhesive layer, and the adhesive layer adheres a part of the arc surface of the electric power transmission cable to the thermal conductive recess.

Alternatively, the inner wall of the enclosure has a radian, and the electric power transmission cable has an arc surface, the arc surface has a radian matching with the radian of the inner wall of the enclosure, to form surface contact.

Alternatively, the electric power transmission cable has a rectangular, annular sector, or square-shaped cross section, or the electric power transmission cable has a split conductor shape, or the cross section of the electric power transmission cable has extension surfaces extending to two sides for connection and thermal conduction.

Optionally, the electric power transmission cable is provided with multiple flexible tension resistant segments.

Optionally, the electric power transmission cable includes multiple segments, and the segments adjacent to each other are offset from each other in a circumferential direction.

Optionally, transition segments between the segments adjacent to each other are bent segments which are arranged inclined, and the bent segments adjacent to each other are bent in opposite directions.

Optionally, a conductor of the electric power transmission component is a hollow conductor having multiple through holes extending in a length direction of the electric power transmission component.

Optionally, the enclosure is made of a metal material or non-metal material entirely, or a lower part of the enclosure is made of a non-metallic material and an upper part of the enclosure is made of a metal material.

Optionally, the enclosure includes a tower of a wind turbine generator system or an exterior wall of a television tower, or a shell of a water surface vehicle or a shell of an underwater vehicle, or a shell of an aviation vehicle.

An electric power transmission carrier is further provided according to the present application, which includes an enclosure and an electric power transmission component mounted on the enclosure, the electric power transmission component is located inside a body of the enclosure, and is in direct or indirect surface contact with the enclosure.

Optionally, an inner wall of the enclosure is provided with a conductor slot, the electric power transmission component is laid in the conductor slot, or a wall body of the enclosure is provided with one or more through holes, and the electric power transmission component is inserted in each of the one or more through holes.

Optionally, a gap between the electric power transmission component and the conductor slot or between the electric power transmission component and the through hole is filled with a cured layer formed by an impregnation liquid after being cured, and the cured layer and the conductor slot constitute a thermal conductive bridge.

Optionally, the conductor of the electric power transmission component is laid in the conductor slot or the through hole, a gap between the conductor and the conductor slot or between the conductor and the through hole is filled with a cured layer formed by an impregnation liquid after being cured, and the cured layer is an insulation layer of the power transmission component.

Optionally, the insulation layer is formed by an ultrasonically assisted impregnation process.

Optionally, the conductor is wrapped or wound with continuous fibers or discontinuous fibers to allow the formed insulation layer to contain the continuous fibers or the discontinuous fibers.

Optionally, a wedge is provided at a slot opening of the conductor slot to block the slot opening Optionally, thermal conductive ribs are provided on the inner wall of the enclosure and protrude from the inner wall of the enclosure, and the conductor slot is formed between the thermal conductive ribs adjacent to each other.

Optionally, the thermal conductive ribs are each provided with multiple notches in a length direction, and the electric power transmission component is formed with a flexible tension resistant segment at each of the notches.

Optionally, the electric power transmission carrier further includes a reinforcing material layer, and the reinforcing material layer covers the slot opening of the conductor slot, and the impregnation liquid impregnates the reinforcing material layer to form a protective thermal insulation layer.

Optionally, the electric power transmission components are mounted at equal intervals in a circumferential direction of the enclosure, or the electric power transmission components are only mounted at a shady side of the enclosure.

Optionally, the conductor of the electric power transmission component is a hollow conductor, and has multiple through holes extending in a length direction thereof.

Optionally, the enclosure is entirely made of a metal material or a non-metal material, or the enclosure has a lower part made of a non-metal material and an upper part made of a metal material.

Optionally, the enclosure includes a tower of a wind turbine generator system or an exterior wall of a television tower, or a shell of a water surface vehicle or a shell of an underwater vehicle, or a shell of an aviation vehicle.

An enclosure is further provided according to the present application. A thermal conductive bridge for carrying an electric power transmission component and conducting heat generated by the electric power transmission component to the enclosure is provided on an inner wall of the enclosure, the thermal conductive bridge allows the electric power transmission cable to be in direct or indirect surface contact with the inner wall of the enclosure, and the enclosure functions as a heat sink for the power transmission component.

Optionally, the thermal conductive bridge is fixed to the inner wall of the enclosure by a mechanical fixing means, or is pre-formed in the inner wall of the enclosure.

Optionally, the electric power transmission component includes an electric power transmission cable, the thermal conductive bridge has a connecting surface configured to be connected to the inner wall of the enclosure and a thermal conductive arc surface configured to mount the electric power transmission cable;

or, the thermal conductive bridge includes an arc-shaped thermal conductive recess extending from the inner wall of the enclosure.

Optionally, the thermal conductive bridge includes thermal conductive ribs protruding from a surface of the inner wall of the enclosure, and a conductor slot configured to mount the electric power transmission component is formed between the thermal conductive ribs adjacent to each other.

Optionally, the enclosure is entirely made of a metal material or a non-metal material, or the enclosure has a lower part made of a non-metal material and an upper part made of a metal material.

A method for manufacturing an electric power transmission carrier is further provided according to the present application, the electric power transmission carrier includes an enclosure and an electric power transmission component mounted on the enclosure, and the manufacturing method includes:

machining a conductor slot in an inner wall of the enclosure;

laying an electric power transmission cable or a conductor of the electric power transmission cable in the conductor slot;

injecting an impregnation liquid into the conductor slot; and curing the impregnation liquid to form a cured layer.

Optionally, the method includes laying a vacuum bag outside the conductor slot, to establish a vacuum environment of the conductor slot, and injecting the impregnation liquid into a gap between the electric power transmission cable and the conductor slot or between the conductor and the conductor slot by vacuum suction.

Optionally, the method includes covering a reinforcing material layer on the conductor slot, covering the vacuum bag outside the reinforcing material layer, injecting the impregnation liquid into the reinforcing material layer, and curing the impregnation liquid to form a protective thermal insulation layer.

Optionally, at the time of curing, the impregnation liquid is cured by at least one of a microwave heating device, a radio-frequency heating device, a far infrared heating device and an electric heating device.

In the electric power transport carrier, the enclosure and the manufacturing method for the electric power transport carrier according to the present application, the new type electric power transport carrier has the electric power transmission cable or conductor mounted on an enclosure such as a tower barrel or a high tower to perform power transmission and take the enclosure as a heat sink. The mounting method includes mounting by fixing on a surface, mounting by internal molding the structure internally, mounting by embedding, etc. This makes revolutionary technological innovation to the design concept, the manufacturing and laying method of the conventional power transmission carrier. The electric power transmission cable and the inner wall surface of the enclosure are in surface contact, which can improve the contact area for heat transfer. By taking the enclosure, the "heat sink" having a huge thermal capacity as the "cold source", the electric energy transmission, the transmission power of the cables and conductors can be effectively improved compared with those having the same cross sectional area in the conventional technology, and also the heat dissipation effect of the electric power transmission cable or conductor can be improved, and the objects of improving the elasticity, reducing the crispiness of the tower enclosure at a cold region in winter, improving the stability of the enclosure itself, and the safety of the whole system are achieved. There is no longer any unbalanced damage to the thermal environment in the enclosure by an electric power transmission conductor in the enclosure, and correspondingly, the thermal balance capability of the enclosure itself is improved, and the requirements on the internal environment temperature imposed by other electric equipment in the enclosure are reduced, and correspondingly, the design and manufacturing costs of the electric and electronic type transmission equipment containing bearings are reduced.

BRIEF DESCRIPTION OF THE DRAWINGS

FIG. 1-2 is a schematic view showing the composition of a resulting temperature outside a tower in summer in the conventional technology;

FIG. 1-3 shows resulting temperatures of the tower in the conventional technology in different orientations;

FIG. 2-1 is a schematic view showing the structure of a first embodiment of an enclosure according to the present application;

FIG. 2-2 is a schematic partially enlarged view of part A in FIG. 2-1;

FIG. 2-3 is a schematic view showing that cables in FIG. 2-1 are laid at a shady side of the enclosure;

FIG. 2-4 is a schematic view showing that the cables in FIG. 2-1 are laid on an inner wall of the shady side of the enclosure in a bent manner;

FIG. 2-5 is a schematic view showing a structure in which a thermal conductive bridge is arranged on a tower wall in FIG. 2-1;

FIG. 2-6 is a schematic view showing the structure of the thermal conductive bridge in FIG. 2-5;

FIG. 3-1 is a schematic view showing the structure of a second embodiment of the enclosure according to the present application;

FIG. 3-2 is a schematic view showing that cables in FIG. 3-1 are laid at the shady side of the enclosure;

FIG. 3-3 is a schematic view showing a structure in which a thermal conductive bridge is arranged on a tower wall in FIG. 3-1;

FIG. 3-4 is a schematic view showing the structure of the thermal conductive bridge in FIG. 3-3;

FIG. 4-1 is a schematic view showing the structure of a third embodiment of the enclosure according to the present application;

FIG. 4-2 is a schematic partially enlarged view of part B in FIG. 4-1;

FIG. 4-3 is a schematic diagram of an electric power transmission cable having a hollow conductor in the third embodiment;

FIG. 4-4 is a schematic diagram of an electric power transmission cable having a hollow conductor and arranged with a certain radian in the third embodiment;

FIG. 4-5 is a schematic view showing the structure of a cable capable of making direct surface contact with the inner wall of the shady side of the enclosure in the third embodiment;

FIG. 4-6 is a schematic view showing the structure of another kind of cable capable of making direct surface contact with the inner wall of the shady side of the enclosure in the third embodiment;

FIG. 5-1 is a schematic view showing a structure in which electric power transmission cables are laid at the shady side in a bent manner in a fourth embodiment of the enclosure according to the present application;

FIG. 5-2 is a schematic view showing another structure in which electric power transmission cables are laid at the shady side in a bent manner in the fourth embodiment of the enclosure according to the present application;

FIG. 6-1 is a schematic view showing the structure of a fifth embodiment of the enclosure according to the present application;

FIG. 6-2 is a schematic partially enlarged view of part C in FIG. 6-1; and

FIG. 6-3 is a vertical sectional view of FIG. 6-1.

Figure 1:
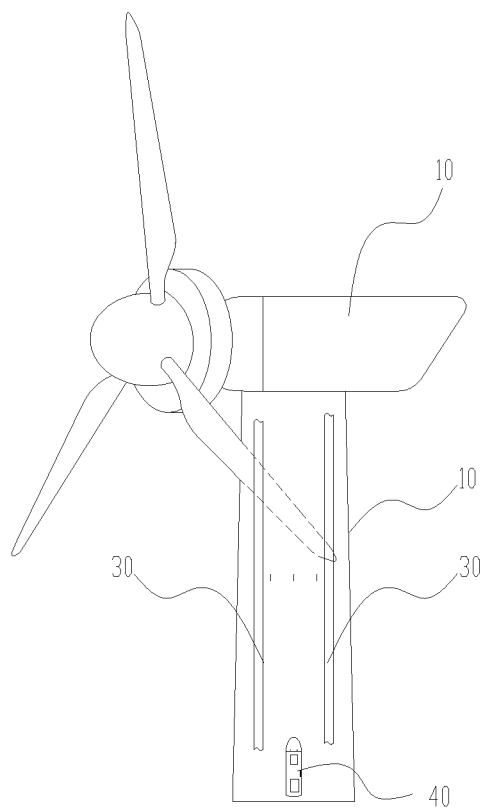
FIG. 1-1 is a schematic view showing the structure of a tower in the conventional technology.
Figures 1, 2:
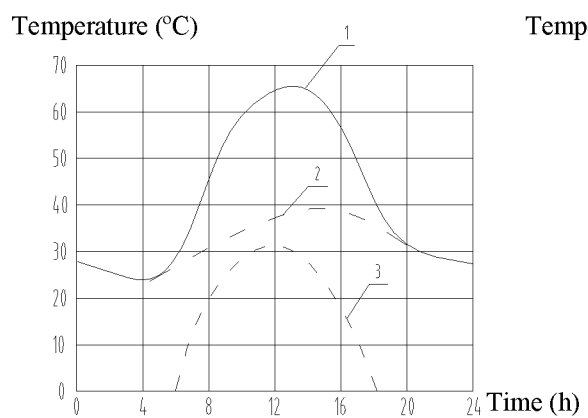
Figures 1, 2, 3:
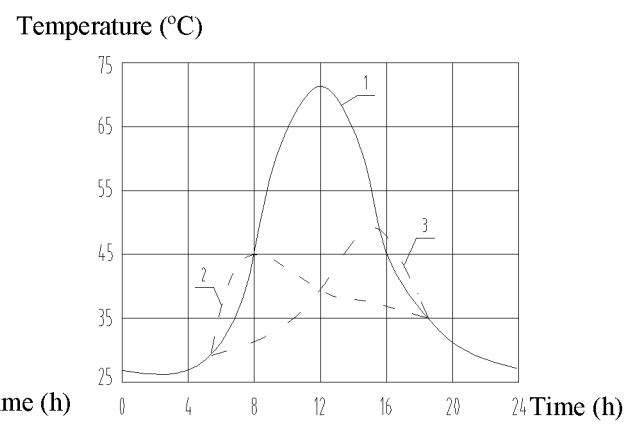

Reference numerals in FIG. 1-1 to FIG. 1-3:

| 10 | tower wall, | 20 | nacelle, |
| 30 | electric power transmission cable, | 40 | tower door; |

Reference numerals in FIG. 2-1 to FIG. 6-3:

| 100 | tower wall, | 101 | thermal conductive rib, |
| 101a | positioning hole, | 102 | conductor slot, |
| 102' | gap, | 103 | wedge, |
| 104 | reinforcing material layer, | 105 | notch, |
| 200 | electric power transmission cable, | 200a | conductor, |
| 200b | insulation layer, | 200a' | through hole, |
| 201 | flexible tension resistant segment, | 202 | vertical segment, |
| 300 | thermal conductive bridge, | 300a | first arc surface, |
| 300b | second arc surface, | 400 | fastening band, |
| 500 | fastener, | 600 | pressing bar, |
| 700 | spring. | | |

DETAILED DESCRIPTION OF EMBODIMENTS

For enabling the person skilled in the art to better understand the technical solution of the present application, the present application is described further in detail hereinafter with reference to the drawings and embodiments.

The term carrier in the electric power transmission carrier in the embodiments of the present application has the following meanings: firstly, it means bearing in the sense of mechanics; secondly, it means electric energy transmission in the sense of electricity; thirdly, it means thermal energy transferring (or transmission) and heat sinking in the sense of thermology.

An enclosure in the power transmission carrier in the following embodiments is described by using a tower as an example, and accordingly, a wall of the enclosure refers to a wall of the tower.

The tower is internally provided with power transmission components, which are in contact with an inner wall of the tower or are directly located inside the body of the tower, to be in direct or indirect surface contact with the tower.

The surface contact allows the enclosure of the present application to be used as a heat sink of the power transmission components. Based on the fact that the mass of the enclosure is infinitely large compared with the mass of the power transmission components, the heat generated by the power transmission components is infinitely small compared with the thermal capacity of the enclosure, and the heat generated by the power transmission components is absorbed by using the enclosure as the heat sink of the power transmission components. Relative to the heat generation rate of the electric power transmission components, the enclosure has a huge thermal capacity and thus can quickly and sufficiently absorb the heat generated by the power transmission components. Moreover, with a large area of the outer wall of the enclosure facing the natural environment and the atmospheric space, the outer wall of the enclosure can dissipate the heat generated by the power transmission components to the natural environment based on Newton's law of cooling and Stefan-Boltzmann's law (the fourth power law of heat radiation of a black body).

First Embodiment

Reference is made to FIG. 2-1, which is a schematic view showing the structure of the first embodiment of the enclosure according to the present application, which shows that electric power transmission cables 200 are laid at a shady side of the enclosure, and schematically shows a partial cross-sectional view in the Figure. In the embodiments herein, the electric power transmission cables 200 are taken as an example for the power transmission components in the embodiments herein.

As shown in FIG. 2-1, a thermal conductive bridge 300 is provided between the electric power transmission cable 200 and an inner surface of a tower wall 100, and is configured to conduct the heat generated by the electric power transmission cable 200 to the above enclosure (i.e., a heat sink of the electric power transmission cable 200). The electric power transmission cable 200 may be laid in an installed tower, or may be laid in an uninstalled tower, or may be laid even before the tower wall 100 is formed (as in a fifth embodiment), however, a portion, corresponding to the electric power transmission cable 200, of the tower wall 100 is at a shady side of the tower after being installed formally. Therefore, in the embodiments, the inner surface of the tower wall 100 is referred to as a shady side inner wall.

The electric power transmission cable 200 is in surface contact with the thermal conductive bridge 300, and the thermal conductive bridge 300 is in surface contact with the shady side inner wall of the tower. That is, the electric power transmission cable 200 is in indirect surface contact with the shady side inner wall via the thermal conductive bridge 300. The thermal conductive bridge 300 here is obviously a structure that has a thermal conductive effect, and has a thermal conductivity higher than that of air, and therefore can transmit the heat of the electric power transmission cable 200 to the shady side inner wall more efficiently, to achieve rapid cooling and heat exchange.

The reason for providing the thermal conductive bridge 300 is to enable the electric power transmission cable 200 to make surface contact with the shady side inner wall. It can be seen from FIG. 2-1 that, the cylindrical electric power transmission cable 200, when having no deformation, is in linear contact with the shady side inner wall. One side of the thermal conductive bridge 300 is formed into an arc shape that wraps the electric power transmission cable 200 and in surface contact with the electric power transmission cable 200, and another side of the thermal conductive bridge 300 is adapted to the radian of the shady side inner wall to be in surface contact with the shady side inner wall, thereby achieving the indirect surface contact between the electric power transmission cable 200 and the shady side inner wall, and improving the heat exchange effect.

In particular, the thermal conductive bridge 300 may be an adhesive, such as silicone rubber adhesive, and in this case, the adhesive layer formed by bonding the adhesive is just the thermal conductive bridge 300, which, in one aspect, may form a thermal conductive structure with a high thermal conductivity and is easy to form a radian that allow the two sides of the thermal conductive bridge 300 to respectively match with the electric power transmission cable 200 and the shady side wall surface as described above, to further become a thermal transmission media for forming a surface contact between the electric power transmission cable 200 and the shady side inner wall, and in another aspect, has a function of fixing the electric power transmission cable 200 to the shady side inner wall, to effectively maintain the thermal exchanging state of the electric power transmission cable 200 with the shady side inner wall.

Figures 1, 2:
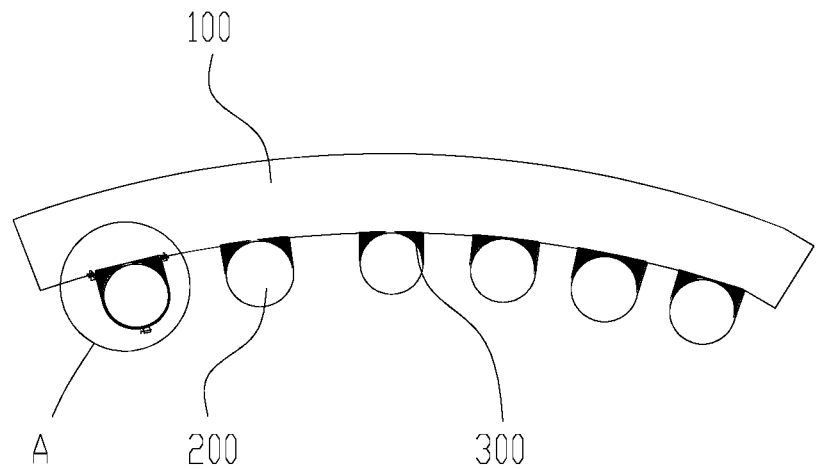
Figure 2:
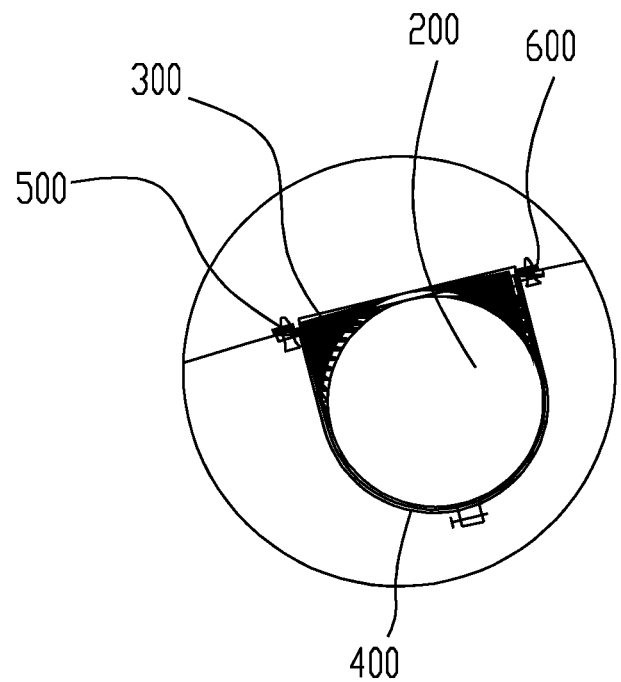
Figures 2, 3:
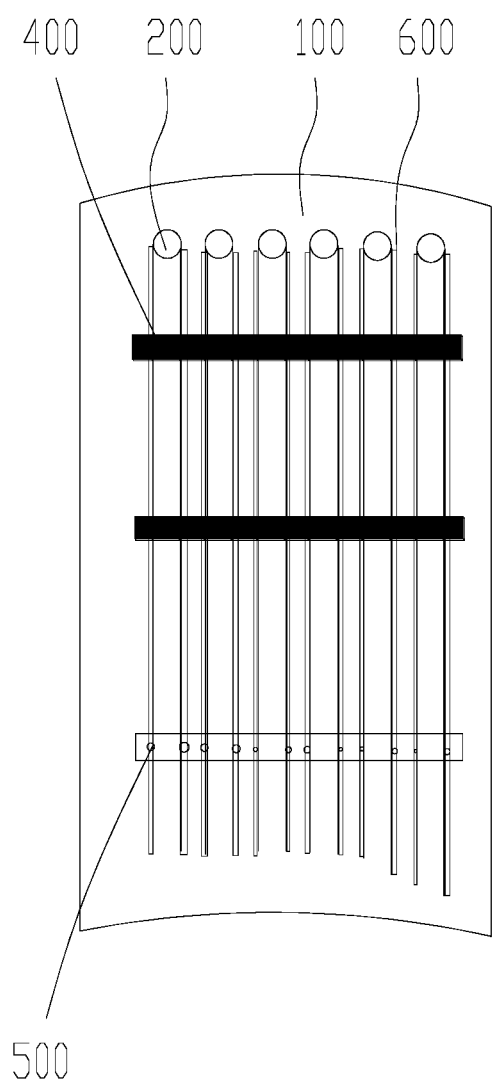
Figures 2, 3, 4:
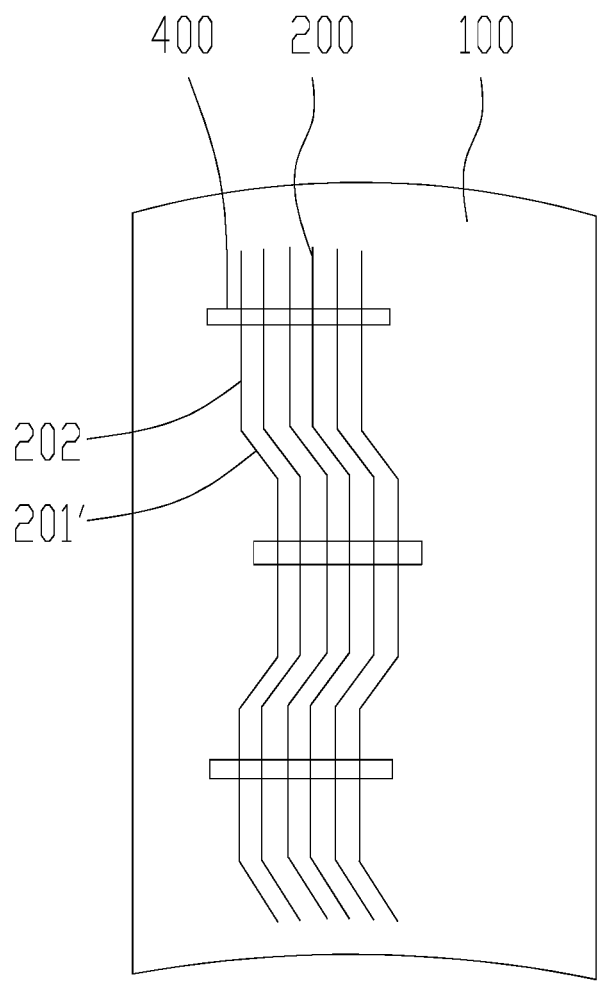

Reference is made to FIG. 2-1, and further to FIG. 2-2 and FIG. 2-3, FIG. 2-2 is a partially enlarged view of part A in FIG. 2-1, FIG. 2-3 is a schematic view showing that electric power transmission cables 200 in FIG. 2-1 are laid at the shady side; and FIG. 2-4 is a schematic view showing that the cables in FIG. 2-1 are laid on the shady side inner wall in a bent manner.

In addition to use bonding to realize fixation, a fastening band 400 may be further provided, and the fastening band 400 has a clamping hoop structure, to clamp the electric power transmission cable 200, and is fixed to the shady side inner wall of the tower by a fastener 500, and the fastener 500 may be a bolt type component. In this embodiment, the electric power transmission cable 200 is in a cylindrical shape, and the fastening band 400 is correspondingly designed to have an arc shape so as to adapte to an outer wall of the electric power transmission cable 200. In FIG. 2-2, the fastening band 400 is of an approximate U shape, and an edge of the U-shaped opening has an extending leg, and the fastener 500 passes through the extending leg to be inserted into the shady side inner wall to realize fixation.

A pressing bar 600 is further provided in this embodiment, and the pressing bar 600 is arranged between the extending leg and the shady side inner wall, to improve the pressing effect, it also has a tightness adjusting function, so as to adjust the tightness of the fastening band 400 in assembly, or to make adaptive adjustment according to changes in contraction due to temperature differences in use.

Reference is further made to FIG. 2-4, the electric power transmission cable 200 may be laid in a bent manner, to form several segments, and adjacent segments are staggered in the circumferential direction, and the segment in FIG. 2-4 is referring to a vertical segment 202. With this arrangement, the area of the shady side inner wall participating in heat exchange may be increased, and thus the heat exchange effect can be improved. With this arrangement, the interference of heat exchange between adjacent vertical segments 202 can be reduced. In addition to exchange heat with a portion of the shady side inner wall where they attach, the vertical segments 202 also utilizes a heat exchange area of an upper part of the shady side inner wall above the portion where they attach according to the principle of heat rise. Based on the bent arrangement manner, the adjacent upper vertical segment 202 is offset from the upper position of the lower vertical segment 202, and the adverse effect caused by the heat rise of the lower vertical segment 202 on the heat dissipation of the upper vertical segment 202 may be reduced.

When several vertical segments 202 are arranged in a staggered manner, a transition segment may be formed between adjacent vertical segments 202, that is, a bent segment 201' shown in FIGS. 2 to 4. The electric power transmission cable 200 is vertically disposed, then is bent and then vertically extends, and is then bent reversely, that is, the vertical segments 202 and the bent segments 201' are arranged alternately in sequential, and adjacent bent segments 201' are bent in opposite directions. In this way, with the area of the shady side being constant, a long electric power transmission cable can be arranged to have several adjacent vertical segments 202 staggered from one another in the circumferential direction.

The thermal conductive bridge 300 may also be formed on the tower in advance, as shown in FIGS. 2-5 and 2-6. FIG. 2-5 is a schematic view showing a structure in which the thermal conductive bridge 300 is arranged on a tower wall in FIG. 2-1; and FIG. 2-6 is a schematic view showing the structure of the thermal conductive bridge 300 in FIG. 2-5.

The thermal conductive bridge 300 can be directly machined to the structure shown in FIG. 2-6 (the black body part), that is, one side (an upper side in FIG. 2-6) of the thermal conductive bridge 300 is a first arc surface 300a that matches the shady side inner wall (compared with the entire inner wall of the tower, the radian is not obvious), i.e., having a connection surface connected to the inner wall of the enclosure, and another side (a middle lower side in FIG. 2-6) of the thermal conductive bridge 300 forms a second arc surface 300b configured to wrap a part of the outer circumferential surface of the cylindrical electric power transmission cable 200, that is, a thermal conductive are surface for carrying the electric power transmission cable 200. The thermal conductive bridge 300 can be fixed to the tower by a fastener 500, or the thermal conductive bridge 300 can be a metal member fixed to the tower by welding. In a case that the tower is a metal member (for example, a steel structure), the thermal conductive bridge 300 may be formed by the metal the same as the material of the tower. The thermal conductive bridge may also be an arc-shaped thermal conductive recess extending from the tower wall 100, that is, being preformed on the tower wall 100. Whatever the thermal conductive bridge 300 is preformed on the tower wall 100 or is fixed to the tower wall 100 later, a part of the arc surface of the electric power transmission cable 200 can be adhered to the thermal conductive bridge 300 by the adhesive layer. Of course, the enclosure may be made entirely of a metal material or a non-metal material such as concrete, and may also be made of mixed materials, for example, its upper part is made of a metal material, and its lower part is made of a non-metal material.

Second Embodiment

Reference is made to FIG. 3-1. FIG. 3-1 is a schematic view showing the structure of a second embodiment of the enclosure according to the present application, which shows that the electric power transmission cables 200 are laid at a shady side of the enclosure, and schematically shows part of the cross section. FIG. 3-2 is a schematic view showing that the electric power transmission cables 200 in FIG. 3-1 are laid at the shady side.

Unlike the first embodiment, in this embodiment, the area of the thermal conductive bridge 300 in contact with the electric power transmission cable 200 is larger, and the area of the thermal conductive bridge 300 in contact with the shady side inner wall is also increased, and is above ⅓ of the outer peripheral surface of the electric power transmission cable 200, such that the heat dissipation effect is better. In this case, the thermal conductive bridge 300 of each electric power transmission cable 200 extends further leftward and rightward. In FIG. 3-1, the adjacent thermal conductive bridges 300 are connected. In a case that the thermal conductive bridge 300 is formed by an adhesive, all the thermal conductive bridges 300 can be connected integrally and thus the stability is high.

Whether or not the thermal conductive bridges 300 are connected integrally, in this embodiment, it may arrange only one pressing bar 600 between two adjacent electric power transmission cables, and the pressing bar 600 presses both of the adjacent thermal conductive bridges 300. The fastening band 400 configured to lock all of the electric power transmission cables 200 may also be an integral structure, and the same fastener 500 is used between two adjacent electric power transmission cables 200 to extend through the pressing bar 600 and the thermal conductive bridge 300 and then be inserted into the shady side inner wall to achieve fixation, thus, the operation is more convenient. Of course, the arrangement of the integral fastening band 400, and the pressing bar 600 and the fastener 500 in the second embodiment may also be used in the first embodiment.

Similar to FIGS. 2-5 in the first embodiment, the thermal conductive bridge 300 in this embodiment may also be formed on the tower, as shown in FIG. 3-3 and FIG. 3-4, FIG. 3-3 is a schematic view showing a structure in which the thermal conductive bridge 300 is arranged on a tower wall in FIG. 3-1; and FIG. 3-4 is a schematic view showing the structure of the thermal conductive bridge 300 in FIG. 3-3, the thermal conductive bridge 300 is formed with a first arc surface 300a in surface contact with the shady side inner wall and a second arc surface 300b for wrapping the electric power transmission cable 200. The second arc surface 300b in FIG. 3-4 has a larger wrapping range compared with that in FIG. 2-6, and approximately ½ of the outer periphery of the electric power transmission cable 200 is wrapped, and accordingly the volume of the thermal conductive bridge 300 that can participate in the heat transfer is increased (the main reason is that the length and thickness of the side wall of the thermal conductive bridge 300 are both increased, and the thermal conductive effect is improved significantly). Reference may be made to the description of the above FIGS. 2-6 for the specific forming method of the thermal conductive bridge 300.

Third Embodiment

Referring to FIG. 4-1, FIG. 4-1 is a schematic view showing the structure of a third embodiment of the enclosure according to the present application, which shows that the electric power transmission cables 200 are laid on the shady side of the enclosure, and schematically shows a partial cross-sectional view. FIG. 4-2 is a schematic partially enlarged view of part B in FIG. 4-1.

In this embodiment, the electric power transmission cable 200 is in direct surface contact with the shady side inner wall of the tower, and as shown in FIG. 4-1, the electric power transmission cable 200 is substantially quadrate (in a rectangular shape or a square shape), and its side facing the shady side has in fact a certain radian adapted to the shady side, so as to form a direct surface contact with the shady side. This type of cable structure design may just achieve large area heat exchange without additionally providing the thermal conductive bridge 300, so as to make full use of the "cold source" of the shady side.

Of course, in order to further ensure that the heat exchange state of surface contact is continuously maintained, the thermal conductive bridge 300 formed by the adhesive layer as described in the above embodiments may also be additionally provided, that is, the thermal conductive bridge 300 as well as corresponding fastening means may also be provided between the electric power transmission cable 200 and the shady side inner wall in the third embodiment.

In FIG. 4-1, a fastening means is also provided for directly fastening the electric power transmission cable 200 to the shady side inner wall, and as shown in FIG. 4-2, the fastening means also includes a fastening band 400 and a fastener 500, and the fastening band 400 is in a square shape correspondingly. In addition, in this embodiment, the fastening means is not provided with the pressing bar 600, but provided with an adjustment spring 700. The adjustment spring 700 is arranged between an extending leg of the fastening band 400 and the shady side inner wall, and the fastener 500 runs through the extending leg and the adjustment spring 700 and then is inserted into the shady side inner wall, to have a function similar to that of the pressing bar 600, and the fastener 500 can function to adjust tightness.

Reference is further made to FIG. 4-3, FIG. 4-3 is a schematic diagram of an electric power transmission cable having a hollow conductor in the third embodiment; and FIG. 4-4 is a schematic diagram of an electric power transmission cable having a hollow conductor and arranged with a certain radian in the third embodiment.

It can be seen from the diagrams that, the conductor 200a of the electric power transmission cable 200 is designed as a hollow conductor, and has several through holes 200a' extending in a length direction of the electric power transmission cable 200. The number of the through holes 200a' as shown in the figures is 9, however actually, the number and position of the through holes 200a' can be determined according to parameters such as practical dimension and power conductive capacity of the electric power transmission cable 200, which is not limited here. The electric power transmission cable 200 is designed as the hollow conductor, thus, when the alternating power passes, the deposition effect of the current can be reduced in one aspect, and the heat dissipation and cooling can be facilitated in another aspect. It should be known that, the structure of the hollow electric power transmission cable 200 is applicable to any of the embodiments herein.

The electric power transmission cable 200 shown in FIG. 4-3 has a rectangular cross section (which may also be square), and the electric power transmission cable 200 shown in FIG. 4-4 is elongated but has a certain radian in cross section. Based on the need of surface contact, it would be better if the structure in FIG. 4-3 is provided with the thermal conductive bridge 300, and the structure in FIG. 4-4 can be directly attached to the shady side inner wall to achieve surface contact. In fact, for the entire tower wall 100, the electric power transmission cable 200 has a small radial dimension, and the electric power transmission cable 200 also generally has a certain deformability, and therefore the structure in FIG. 4-3 may also achieve the surface contact effect after being fastened, of course, it may have a better effect if the electric power transmission cable 200 is directly processed to have a curved side matching with the shady side inner wall.

In this embodiment, the electric power transmission cable 200 makes direct surface contact with the shady side inner wall. FIG. 4-1 and FIG. 4-4 show the structure of the corresponding electric power transmission cables 200. According to the principle, the electric power transmission cable 200 may have any structure as long as it has a surface that can come into surface contact with the shady side inner wall.

Figures 2, 3, 4, 5:
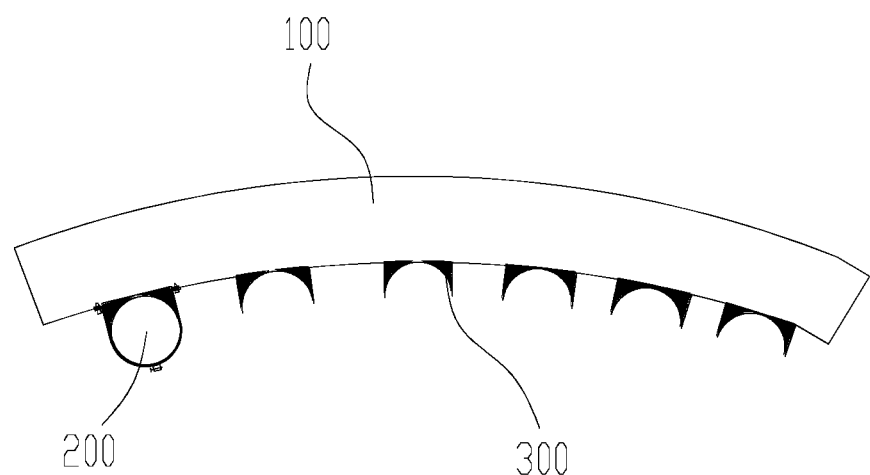
Figures 2, 3, 4, 5, 6:
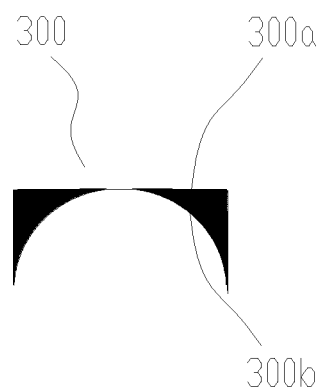
Figures 1, 3:
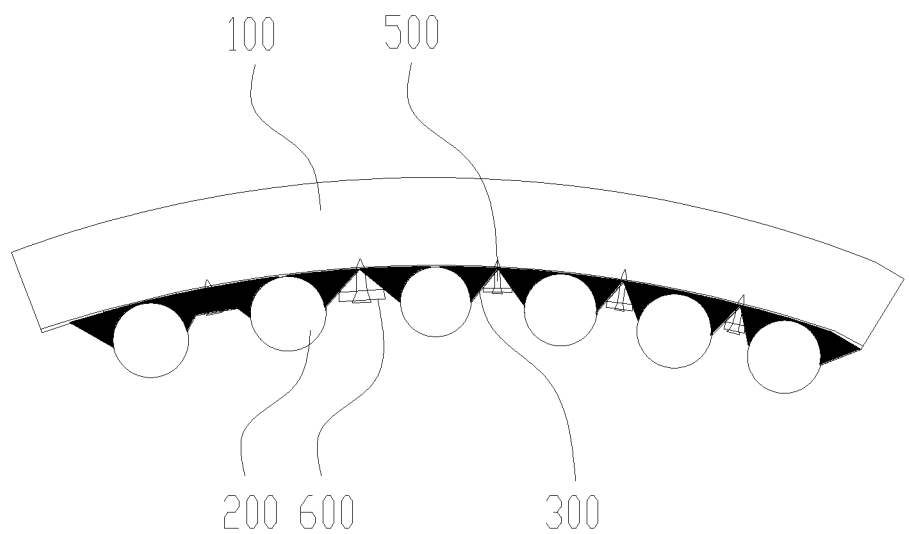
Figures 2, 3:
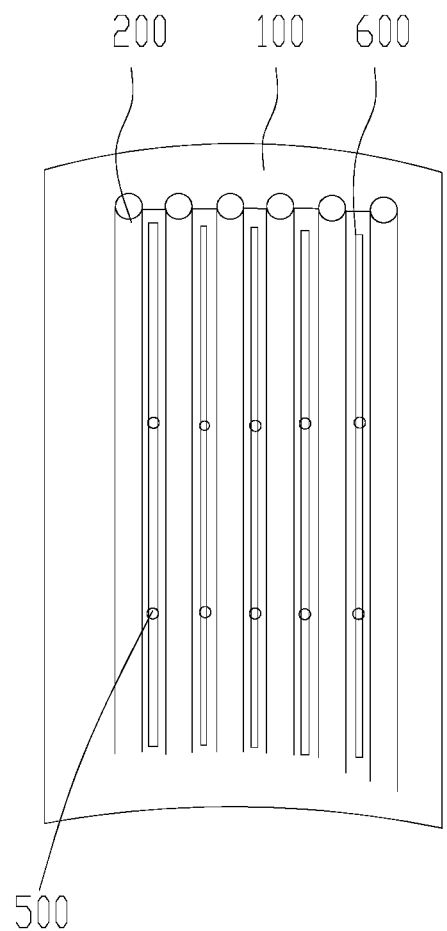
Figure 3:
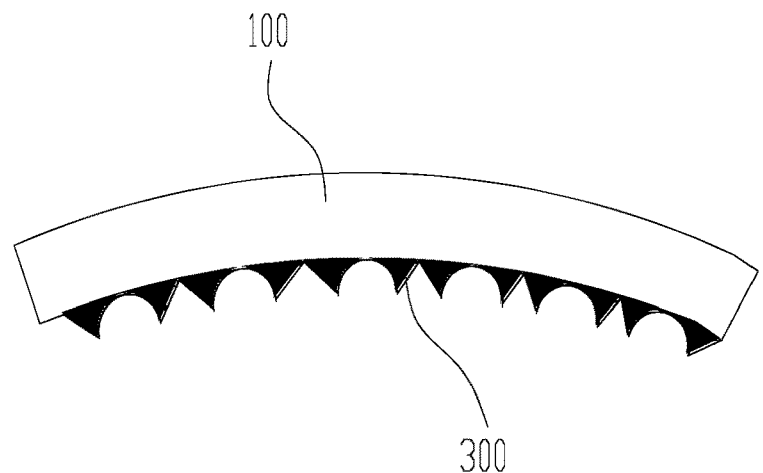
Figures 3, 4:
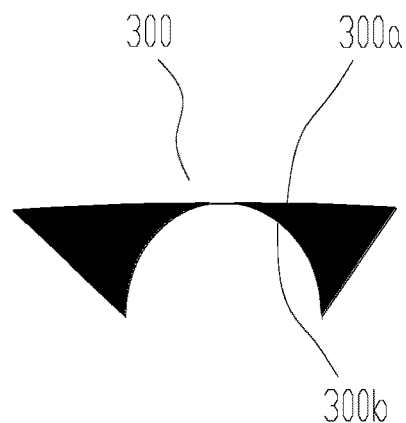
Figures 1, 4:
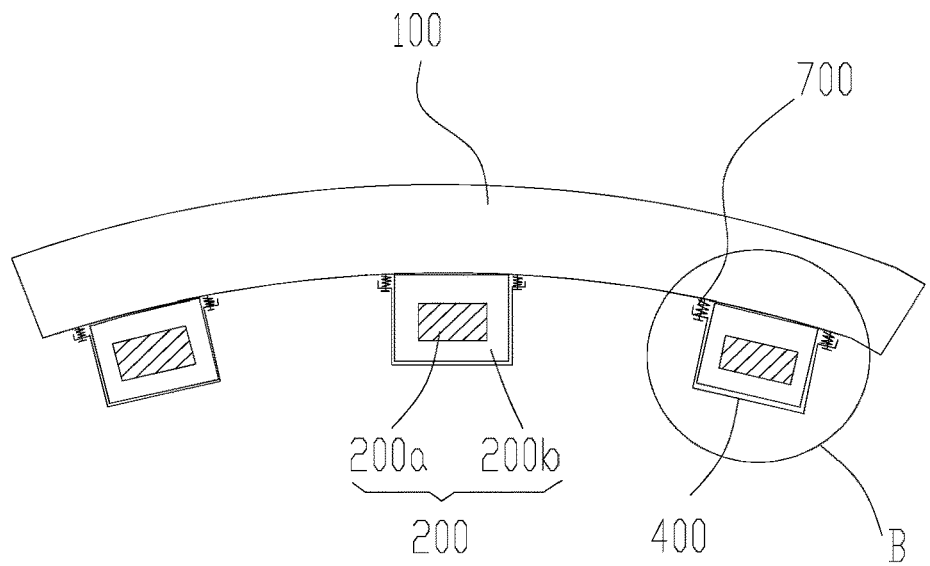
Figures 1, 5:
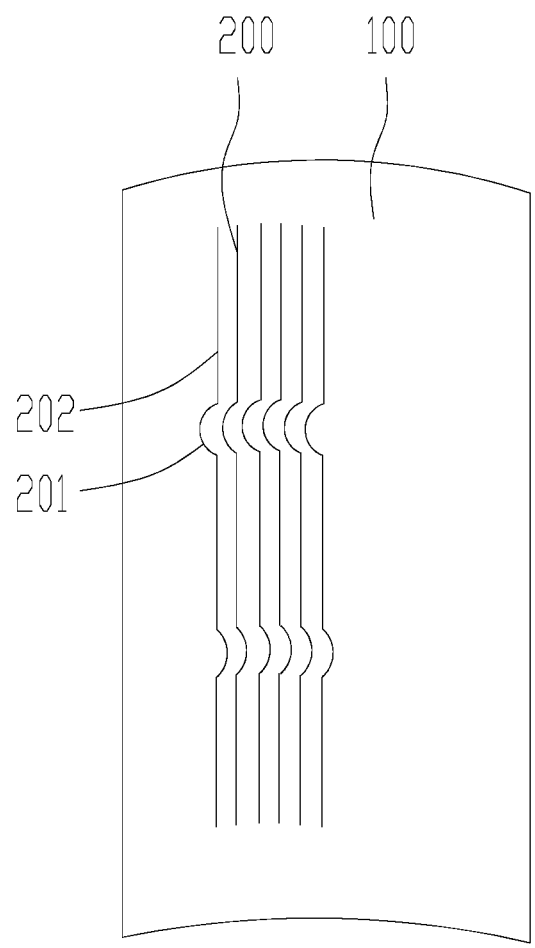
Figures 2, 5:
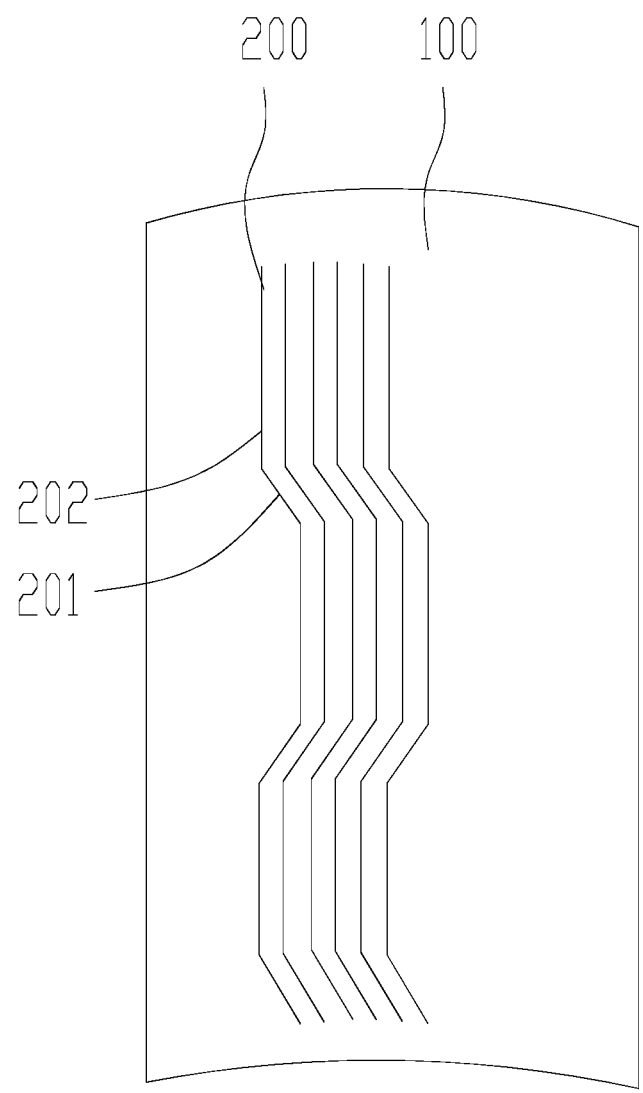
Figures 1, 6:
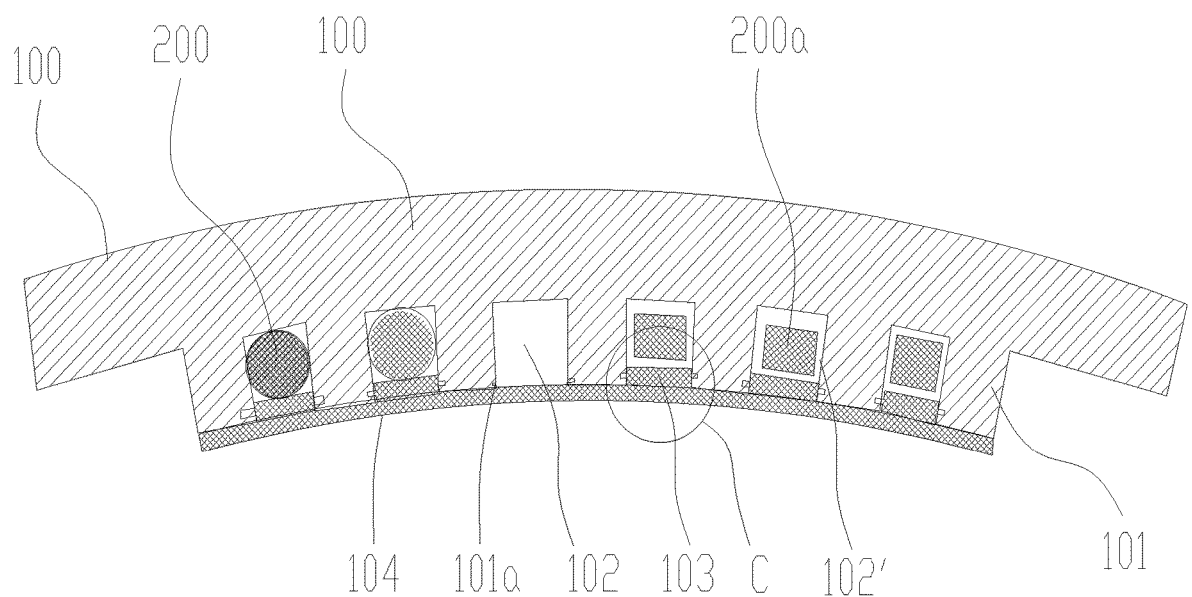
Figures 2, 6:
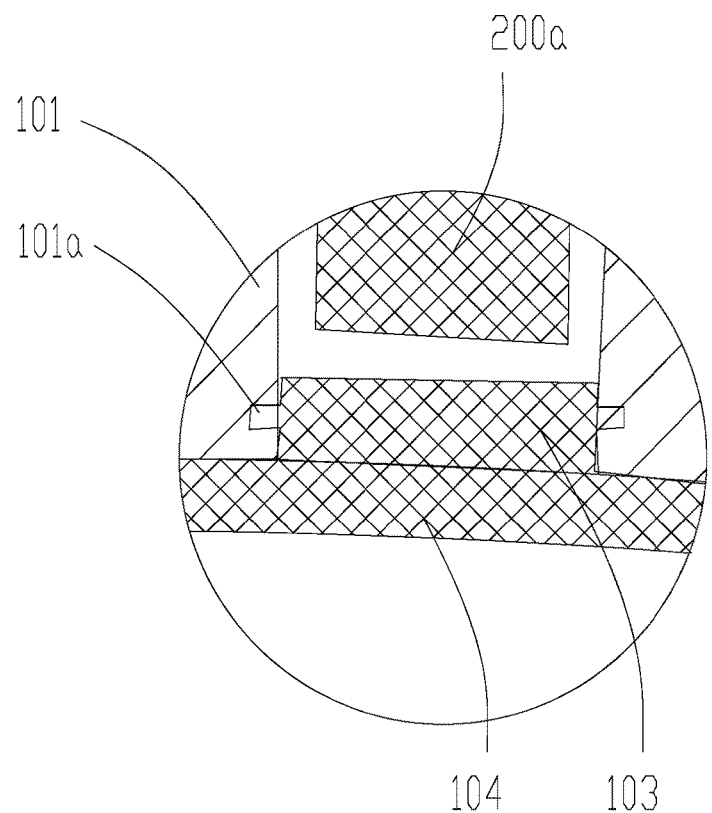
Figures 3, 6:
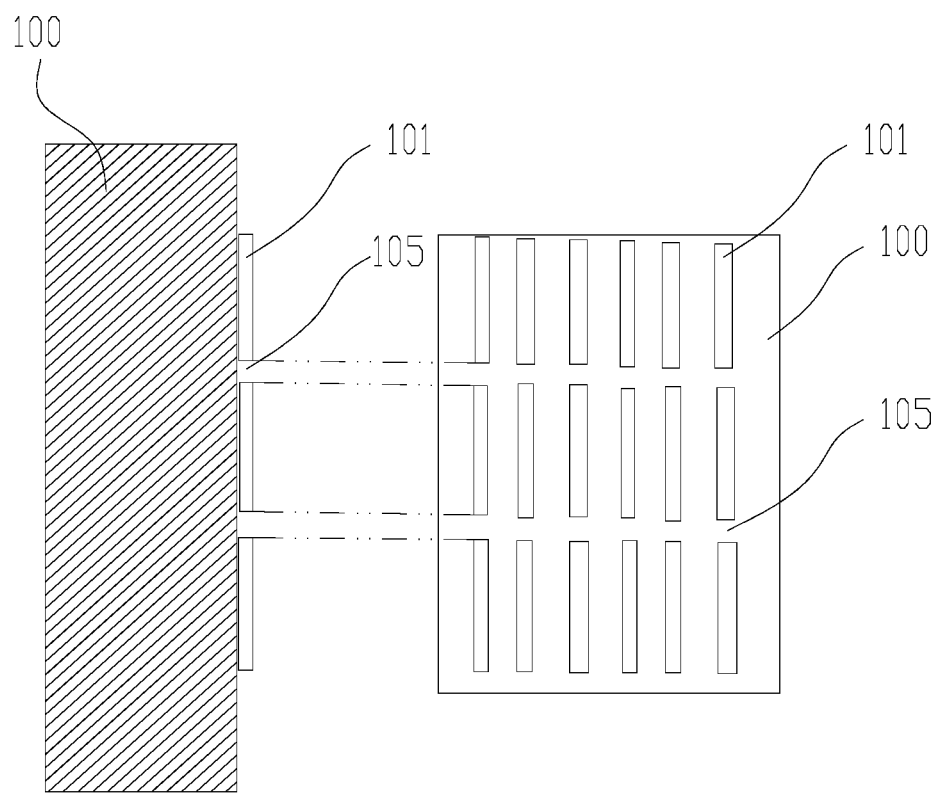

For example, as shown in FIG. 2-5 in the first embodiment, FIGS. 3-4 in the second embodiment, the thermal conductive bridge 300 may be directly formed as a part of the electric power transmission cable 200, and in this case, the structure of the electric power transmission cable 200 is in a non-cylindrical irregular shape, and has an arc surface adapted to the radian of the tower inner wall 100. As shown in FIGS. 4-5 and 4-6, FIG. 4-5 is a schematic view showing the structure of the electric power transmission cable 200 capable of making direct surface contact with the shady side inner wall in the third embodiment, and its upper end is approximately a straight line (actually having a radian matching with the tower wall 100, and the radian is not obvious), and its lower end is a semi-circular arc. FIG. 4-6 is a schematic view showing the structure of another kind of electric power transmission cable 200 capable of making direct surface contact with the shady side inner wall, its lower end is a downwardly convex semi-circular arc, and its upper part is a circular arc having a greater radius compared with the arc at the lower end, and the shape of the electric power transmission cable 200 in FIG. 4-6 is approximate to a trapezoid. Of course, the electric power transmission cable 200 may also be configured to have an annular sector shape.

The embodiments in FIGS. 4-3 to 4-6 are specific examples, and any structure of the electric power transmission cable 200 capable of making surface contact with the shady side inner wall should fall within the scope of protection of the present application. For example, the electric power transmission cable 200 may be in a split wire shape so as to form a surface that can come into contact with the tower wall 100, or, the electric power transmission cable 200 may also have spreading surfaces extending to two sides for connection and thermal conduction, which can also achieve the object of heat transfer through surface contact.

Further, it is conceivable that, in addition to the above arc surface adaption, when the shady side inner wall is a plane or is approximately flat, the electric power transmission cable 200 or the above thermal conductive bridge 300 is also unnecessary to be provided with a radian, and may be planar likewise.

Fourth Embodiment

Referring to FIGS. 5-1 and 5-2, FIG. 5-1 is a schematic view showing a structure in which electric power transmission cables 200 are laid at the shady side in a bent manner in the fourth embodiment of the enclosure according to the present application; and FIG. 5-2 is a schematic view showing another structure in which electric power transmission cables 200 are laid at the shady side in a bent manner in the fourth embodiment of the enclosure according to the present application.

As can be seen from the figures, in this embodiment, the electric power transmission cable 200 is laid in the shape of a straight line (generally laid vertically), and the electric power transmission cable 200 generally includes several straight line segments with a flexible tension resistant segment 201 between adjacent straight line segments. The straight line segment is shown as a vertical segment 202 in this embodiment, and the flexible tension resistant segment 201 is shown as a semi arc segment and an inclined linear segment respectively in FIGS. 5-1 and 5-2. Based on environmental changes, the electric power transmission cable 200 may undergo a contraction change or be deformed based on the deformation of the tower wall 100, and the arrangement of the flexible tension resistant segment 201 facilitates eliminating the adverse effect of contraction variations or other deformations on the entire electric power transmission cable 200. Accordingly, the state of surface contact of the electric power transmission cable 200 with the entire shady side is also ensured. Obviously, this arrangement can be applied to any one of the above embodiments.

Here, the flexible tension resistant segment 201 just has flexibility characteristics, in the embodiment described above, for example when to fix by bonding or banding, the corresponding operation is not performed to the flexible tension resistant segment 201 of the electric power transmission cable 200, and the flexible tension resistant segment 201 is in a relatively free state, to enable it to have a certain deformation capacity, so as to be tension resistant. The semi arc-shaped flexible tension resistant segment 201 in FIG. 5-1 obviously has a deformation margin; and as long as the flexible tension resistant segment 201 of FIG. 5-2 is not fixed, it may naturally have a certain tension resistant capacity. Reference may be further made to FIG. 2-4, the flexible tension resistant segment 201 may just be formed by not fixing the bent segment 201'.

As for the first embodiment, it can be seen from FIG. 2-4 that, a bent laying method has been adopted and a bent segment is formed, and the bent segment may just be designed as the flexible tension resistant segment 201. It can be seen that the structure of the flexible tension resistant segment 201 is not limited to the semi arc shape shown in FIG. 5-1 or the inclined linear segment in FIG. 5-2, other structures may be used as long as the flexible transition between two adjacent straight line segments can be realized to eliminate the adverse effect of contraction.

Fifth Embodiment

Referring to FIGS. 6-1 to 6-3, FIG. 6-1 is a schematic view showing the structure of a fifth embodiment of the enclosure according to the present application, which shows that the electric power transmission cables 200 are laid on the shady side of the enclosure, and schematically shows a partial cross-sectional view; FIG. 6-2 is a schematic partially enlarged view of part C in FIG. 6-1; and FIG. 6-3 is a vertical sectional view of FIG. 6-1.

In the first to fourth embodiments, the electric power transmission cables 200 as electric power transmission components are in direct or indirect contact with the shady side inner wall of the tower, and the inner wall surface is a relatively flat wall surface. In the fifth embodiment, the manner of the electric power transmission cable 200 making contact with the shady side inner wall is realized by embedding the electric power transmission cable 200 in the shady side inner wall, to realize the direct or indirect contact.

As shown in FIG. 6-1, conductor slots 102 are machined in the inner wall of the tower shady side, with slot openings facing towards the inside of the tower. The electric power transmission cable 200 is laid in the conductor slot 102, and the conductor slot 102 extends in a direction in which the electric power transmission cable 200 is suspended, for example, extending vertically.

After the conductor slot 102 is provided, this part of the shady side inner wall is not "flat" in comparison with other parts and includes side wall portions and a bottom wall portion of the conductor slot 102. When the electric power transmission cable 200 is laid in the conductor slot 102, the electric power transmission cable 200 can be in contact with the bottom wall and the side walls of the conductor slot 102, to allow the contact area to be greater, and accordingly, the heat transmission and dissipation rates can be better. In addition to being directly transmitted radially perpendicular to the tower wall 100, the heat may also be transmitted along the side wall of the conductor slot 102 (a thermal conductive rib 101 described hereinafter), and is guided to be transmitted in a circumferential direction of the main body of the tower wall 100, the transmission direction is various, and the contact area is increased, and according to Fourier's law, transmission efficiency is increased significantly, and the shady side "cold source" is fully mobilized to participate in the heat exchange.

In FIG. 6-1, the electric power transmission cable 200 may be a cylindrical or square columnar structure (both the cylindrical and square columnar electric power transmission cables 200 are shown in one figure for simplifying the drawings and facilitating the understanding), or other shapes. In addition, in this embodiment, an impregnation liquid (which may be formed by a mixture of a resin and a curing agent) is filled in a gap 102' located between the electric power transmission cable 200 and the conductor slot 102, and is then cured to form a cured layer, and thus, the electric power transmission cable 200 is positioned in the conductor slot 102 through the cured layer.

It can be understood with reference further to FIGS. 4-1, 4-3, 4-4 that the electric power transmission cable 200 includes a conductor 200a for transmitting electric power, and an insulation layer 200b wrapping the conductor 200a. In this embodiment, the insulation layer 200b of the electric power transmission cable 200 may be formed by the above cured layer, that is to say, not only the electric power transmission cable 200 provided with the insulation layer 200b can be laid in the conductor slot 102, but also the conductor 200a provided without an insulation layer 200b can be directly laid in the conductor slot 102, in this way, when the impregnation liquid is cured, the cured layer just forms the insulation layer 200b wrapping the conductor 200a, and the cured layer and the conductor 200a as a whole form the electric power transmission cable 200. When laying the conductor 200a directly, the conductor 200a is supported to form a gap 102' between the conductor 200a and both the side walls and the bottom wall of the conductor slot 102, so as to form an entirely wrapped insulation layer 200b subsequently.

When the conductor 200a is directly embedded in the conductor slot 102 and then the impregnation process is used, it can be seen that in this embodiment the insulating layer 200b of the electric power transmission cable 200 is formed after the conductor 200a is laid and fixed, and this is a new type of method for forming the electric power transmission cable 200 in the tower, which can meet the requirement of making the electric power transmission cable 200 in surface contact with the shady side inner wall, and can ensure a better contact effect (actually formed integrally). Correspondingly, the heat dissipation performance is further improved. The main object of the present application is to improve the heat dissipation performance of the electric power transmission cable 200, which is very important to the wind turbine tower that is widely affected by over-temperature and accordingly cannot be operated at a large current currently.

A flexible molding vacuum filing impregnation process can be used when injecting the impregnation liquid. Specific process steps are as follows.

A vacuum bag is laid outside the conductor slot 102, the vacuum bag covers the slot opening of the conductor slot 102, and forms a sealed container together with the conductor slot 102, and an input port for the impregnation liquid is reserved in the sealed container so as to allow the sealed container to be in communication with the input pipeline of the impregnation liquid, and also a suction port in communication with the vacuum pump is further reserved in the sealed container, and the injection can be performed from top to bottom, and can also be performed by the effect of self-gravity, of course, injecting from bottom to top is also feasible.

The vacuum pump is activated to establish a vacuum environment in the sealed container to create a pressure gradient between the inlet port and the suction port, to generate a driving force for injecting the impregnation liquid, and then the impregnation liquid gradually fills up the gap 102' between the electric power transmission cable 200 or the conductor 200a and the conductor slot 102.

After the filling is completed, the impregnation liquid is cured to form a cured layer.

The method for injecting such a vacuum impregnation liquid facilitates filling the impregnation liquid more uniformly and sufficiently into the gap 102' between the electric power transmission cable 200 and the conductor slot 102, to allow the heat dissipation to be more uniform and fast. During the curing process, the impregnation liquid may be cured by using at least one of a radio frequency heating device, a microwave heating device, a far infrared heating device and an electric heating device, to form a cured layer. The use of the heating device helps the curing process to be performed faster and better.

In the impregnation process, the conductor 200a may be wrapped or wound with continuous fibers or discontinuous fibers in advance, to allow the insulation layer 200b formed after the impregnation and curing to contain the continuous fibers or discontinuous fibers. The formation of the fibers in the insulation layer 200b will facilitate improving the stability of the insulation layer 200b and reducing the possibility of separation of the insulation layer 200b from the tower or the conductor 200a.

In addition, please continue to refer to FIG. 6-2, a wedge 103 for blocking the slot opening can be provided, and positioning holes 101a are provided in the side walls of the conductor slot 102 at positions close to the slot opening. After the electric power transmission cable 200 or the conductor 200a is arranged in the conductor slot 102, two sides of the wedge 103 are inserted into the positioning holes 101a at the two sides of the conductor slot, to block the slot opening. The wedge 103 may be a bamboo strip, a glass fiber reinforced plastic or may be formed by pressing after the glass fiber cloth impregnated with a colloid. It may be understood that, the wedge 103 facilitates injecting the impregnation liquid into the conductor slot 102, and may also prevent the cured layer from being peeled off from the conductor slot 102 in a later stage. It can be seen that the wedge 103 has a certain plugging effect, but it is not required to seal the slot opening.

Further, a reinforcing material layer 104 may also be laid outside the conductor slot 102 and the wedge 103, and the reinforcing material may be a glass fiber cloth, scrim, canvas, or the like, that is, a material having flexibility and capable of forming supporting skeleton. When performing vacuum impregnation, the vacuum bag covers the outer surface of the reinforcing material layer 104, and the impregnation liquid is filled in the gap of the reinforcing material. The impregnation liquid may directly impregnate the reinforcing material, and may also enter the reinforcing material through the gap between the wedge 103 and the side walls of the conductor slot 102 (sealing is not required, and a large gap may be presented), thus, the subsequent cured reinforcing material layer 104 may be formed integrally with the electric power transmission cable 200.

The reinforcing material layer 104 is added and is impregnated and cured to form a protective thermal insulation layer, and the protective thermal insulation layer has the following technical effects.

When the impregnation liquid is injected, the impregnation liquid may overflow from the gaps between the wedge 103 and the side walls of the conductor slot 102, and the protective thermal insulation layer can avoid the surface irregularity caused by overflowing of the impregnation liquid.

The above-mentioned reinforcing material has a certain thermal insulation effect. When the electric power transmission cable 200 generates heat, more heat will be transmitted from the two sides and the bottom of the conductor slot 102 to the shady side to improve the heat exchange effect, without interfering with the inside of the tower and without being affected by the heat inside the tower.

Moreover, in this embodiment, during forming the tower wall 100, several thermal conductive ribs 101 protruding from the inner surface of the tower wall 100 may be formed. The conductor slot 102 is just formed between adjacent thermal conductive ribs 101. The thermal conductive ribs 101 in FIG. 6-1 extend in a radial direction of the tower, and obviously, the direction is not limited thereto. When rolling a steel plate (for example, a steel plate having a thickness up to 200 mm) to form the tower wall 100, the thermal conductive ribs 101 may be directly formed on the steel plate.

Of course, the thermal conductive ribs 101 may also be welded to the inner surface of the tower wall 100 later. Indeed, the conductive slot 102 may also be directly machined in the inner surface of the tower wall 100 inwards, and in this case, the tower wall will have a weaker strength at the position having the conductor slot 102 (that is the shady side position) compared to other positions, and providing the thermal conductive ribs 101 protruding from the inner surface of the tower wall 100 may ensure the strength without causing waste of material.

Reference is made to FIG. 6-3, in this embodiment, the thermal conductive ribs 101 are discontinuous in the length direction to form notches 105. The electric power transmission cables 200 or the conductors 200*a* laid in the vertically adjacent conductor slots 102 are connected by the flexible tension resistant segment at the notch 105. Specifically, segments of the electric power transmission cable 200 or the conductor 200*a* can be laid into corresponding conductor slots 102, and then be connected by several flexible tension resistant segments. It is also feasible that the entire electric power transmission cable 200 or the entire conductor 200*a* is laid in the several conductor slots 102 arranged in the length direction, and the portion of the electric power transmission cable 200 or the conductor 200*a* at the notch 105 (the segment at the notch 105 needs to be wrapped with the insulation layer 200*b*) is formed as the flexible tension resistant segment. The function of the flexible tension resistant segment may refer to the description for the flexible tension resistant segment 201 in the fourth embodiment, that is, this portion of the electric power transmission cable 200 is not fixed, to have a certain flexible tension resistant capacity, and correspondingly, the arrangement of the flexible tension resistant segment 201 in the fourth embodiment may also be applied here.

It is to be noted that, a conductor slot 102 is provided in this embodiment, and the conductor slot 102 herein is also similar to a thermal conductive bridge structure, however, its thermal conductive efficiency is higher, such that vast majority of the outer periphery of the electric power transmission cable 200 makes surface contact with the tower wall 100, directly or indirectly. According to this principle, it may be understood that it is also possible to machine the through hole directly in the tower wall 100, to directly lay the electric power transmission cable 200 or the conductor 200*a* in the through hole, and impregnation liquid may be injected or may not be injected (for the conductor 200*a*, it needs to inject the impregnation liquid). However, in comparison, the structure using the conductor slot 102 facilitates the laying better, and the cost for punching holes is higher than the cost for providing the conductor slot 102. Of course, the through hole may also be formed by other means. For example, when the tower wall 100 is formed of molten steel, a dome-shaped frame is presented in the mold formed by a steel plate, and thus, the through holes can be automatically formed after the tower wall 100 is formed. Whether the structure using the conductor slot 102 or the structure using the through hole, the objects are both to form the electric power transmission component inside the body of the enclosure. When the electric power transmission component is cured by using the impregnation liquid, the electric power transmission component forms an integral structure with the enclosure, that is, the enclosure has the in-built electric power transmission component, and this is a revolutionary design which is completely different from the conventional manner in which the formed electric power transmission cable 200 is carried by the tower 100.

When arranging the conductor slot 102, the above-mentioned flexible molding vacuum filing impregnation process is adopted, which is actually a kind of liquid molding process, that is, the mold on one side (such as a vacuum bag) is flexible, and when a through hole is machined to perform the impregnation, it does not belong to the flexible impregnation. Whether it is flexible or non-flexible liquid molding process, an ultrasonically assisted impregnation can be performed in impregnating, that is, an ultrasonically assisted liquid impregnation molding process can be adopted. During impregnation, the mechanical energy of the ultrasonic waves facilitates the elimination of air bubbles in the mold cavity and facilitates better bonding of the impregnation liquid with solids (such as the sidewalls and the bottom wall of the conductor slots 102), to allow the performance of the impregnated cured layer to be more reliable.

It is to be noted that, the power transmission components, though located inside the enclosure, need direct or indirect surface contact. The impregnation liquid mentioned above is impregnated and cured to form the insulation layer 200*b* or a simple thermal conductive bridge, which also belongs to a surface contact (more in-depth contact, and molecular bond is generated on the contact surface).

In the above embodiments, a new type of electric power transmission carrier is formed, and for an enclosure being embodied as a tower, a new type of tower structure is just provided. The new type of electric power transmission carrier aiming to provide an enclosure as a heat sink is a revolutionary technology innovation to the conventional technology.

In the above embodiments, the surface contact of the electric power transmission component with the inner wall of the enclosure is achieved, or the electric power transmission component is directly arranged inside the body of the enclosure so as to achieve the surface contact, which have the following technical effects.

First, with the effect generated from the advantages that the enclosure has a huge thermal capacity and has a huge thermal absorption capacity when functioning as a heat sink, the electrical energy transmission capability of the electric power transmission component with the same cross sectional area is greatly increased.

Secondly, the thermal balance capability of the enclosure itself is improved, and due to the heat sink function, the electric power transmission component is no longer a heat generation component inside the enclosure (especially when the electric power transmission component is arranged in the body of the enclosure as in the above fifth embodiment), thereby reducing the requirement on temperature for the heat generation equipment inside the enclosure, and reducing the design and manufacturing costs of the electric and electronic transmission equipment having bearings.

Thirdly, the structure stability of the enclosure when operating in winter is improved. In cold regions in winter, while the electric power transmission component dissipates heat to the tower type enclosure, the enclosure can maintain its elasticity, and reduce the fragility, thereby improving the stability of the enclosure itself and the safety of the whole system.

In the description of the above embodiments, as an example, the electric power transmission component is described as being mounted on the shady side of the enclosure. The shady side is a side of the tower without illumination, and generally refers to a north side. Of course, it may be known from the definition of the shady side that, for sunshine at different regions, the position and area of the shady side may vary, and the above embodiments are to use the "cold source" of the shady side of the tower, to achieve heat dissipation of the electric power transmission cable.

In fact, the power transmission components described above may also be mounted at equal intervals in the circumferential direction of the enclosure in addition to being arranged on the shady side inner wall. Still taking the tower as an example, though not all the power transmission components utilize the cold source of the shady side, relatively speaking, when mounting at equal intervals, the area of the tower wall that can exchange heat with each of the power transmission components increases, which can also achieve good heat dissipation effect. In particular, when the electric power transmission component is arranged inside the body of the enclosure, the cooling effect is also obvious. In addition, the way in which the power transmission components are uniformly mounted circumferentially also facilitates the uniform of the heat exchange of the entire enclosure and the relatively uniform of the temperature field of the enclosure itself, and more facilitates maintaining a better stability and safety of the enclosure in winter as described in the above third point.

In the above embodiments, the tower of the wind turbine generator system is taken as an example, and it may be known that, the enclosure for the electric power transmission carrier may also be embodied in various manners, for example, an exterior wall of a television tower, or a shell of a water surface vehicle such as ships or a shell of an underwater vehicle such as submarines, etc., or a shell of an aviation vehicle such as aircrafts. For water surface vehicles or underwater vehicles, sea water or river water is outside the shell, and the heat is transferred to the outside sea water or river water via the shell, and in this case, the shell and its outside sea water or river water become a heat sink with infinite thermal capacity for the power transmission components. For the aviation vehicles, at an altitude of 8,000 to 10000 meters, the temperature of the atmosphere air outside the shell of the aircraft is about 50 degrees below zero, and the shell and the low temperature atmosphere outside the shell can be used as the heat sink for heat transfer of the power transmission components. The principle is the same as that of the above embodiments using the tower as the enclosure, which is not described further.

The above described embodiments are only preferred embodiments of the present application, and it should be noted that for the person skilled in the art, several improvements and modifications can be made without departing from the principle of the present application, and these improvements and modifications should also be deemed to fall into the scope of protection of the present application.

The invention claimed is:

1. An electric power transmission carrier, comprising an enclosure and a plurality of electric power transmission components mounted on the enclosure, wherein the enclosure comprises a tower of a wind turbine generator system, an exterior wall of a television tower, a shell of a water surface vehicle, a shell of an underwater vehicle, or a shell of an aviation vehicle, and mass of the enclosure is greater than mass of the plurality of electric power transmission components; each of the electric power transmission components is located inside a body of the enclosure, and is in direct or indirect surface contact with the enclosure, and the enclosure acts as a heat sink for the power transmission components;

wherein an inner wall of the enclosure is provided with a plurality of conductor slots, each of the electric power transmission components is laid in a corresponding conductor slot of the conductor slots, or a wall body of the enclosure is provided with a plurality of through holes, and each of the electric power transmission components is inserted in a corresponding through hole of the through holes;

wherein a gap between the electric power transmission component and the corresponding conductor slot or between the electric power transmission component and the corresponding through hole is filled with a cured layer formed by an impregnation liquid after being cured, and the cured layer and the conductor slot constitute a thermal conductive bridge; and wherein a reinforcing material layer is further provided, the reinforcing material layer covers a slot opening of the conductor slot, and the reinforcing material layer is impregnated with the impregnation liquid.

2. The electric power transmission carrier according to claim 1, wherein a conductor of the electric power transmission component is laid in the conductor slot or the through hole, a gap between the conductor and the conductor slot or between the conductor and the through hole is filled with a cured layer formed by an impregnation liquid after being cured, and the cured layer is a insulation layer of the power transmission component.

3. The electric power transmission carrier according to claim 2, wherein a vacuum bag is laid outside the conductor slot, to establish a vacuum environment of the conductor slot, and the impregnation liquid is injected into a gap between the electric power transmission cable and the conductor slot or between the conductor and the conductor slot by vacuum suction; and in curing, the impregnation liquid is cured by at least one of a microwave heating device, a radio-frequency heating device, a far infrared heating device and an electric heating device; and wherein, the insulation layer is formed by an ultrasonically assisted liquid impregnation molding process; and/or the conductor is wrapped or wound with continuous fibers or discontinuous fibers, to allow the formed insulation layer to contain the continuous fibers or the discontinuous fibers; and/or a wedge is provided at the slot opening of the conductor slot to block the slot opening.

4. The electric power transmission carrier according to claim 1, wherein thermal conductive ribs are provided on the inner wall of the enclosure and protrude from the inner wall of the enclosure, and the conductor slot is formed between the thermal conductive ribs adjacent to each other; and the thermal conductive ribs are each provided with a plurality of notches in a length direction, and the electric power transmission component is formed with a flexible tension resistant segment at each of the notches.

5. The electric power transmission carrier according to claim 1, wherein the electric power transmission components are mounted at equal intervals in a circumferential direction of the enclosure, or the electric power transmission components are only mounted at a shady side of the enclosure; and/or a conductor of each of the electric power transmission components is a hollow conductor, and has a plurality of through holes extending in a length direction thereof.

6. The electric power transmission carrier according to claim 1, wherein the enclosure is entirely made of a metal material or a non-metal material, or the enclosure has a lower part made of a non-metal material and an upper part made of a metal material.

7. An enclosure, wherein the enclosure comprises a tower of a wind turbine generator system, an exterior wall of a television tower, a shell of a water surface vehicle, a shell of an underwater vehicle, or a shell of an aviation vehicle; a thermal conductive bridge for carrying a plurality of electric power transmission components and conducting heat generated by the electric power transmission components to the enclosure is provided on an inner wall of the enclosure, the thermal conductive bridge allows the electric power transmission cables to be in direct or indirect surface contact with the inner wall of the enclosure, mass of the enclosure is greater than mass of the plurality of electric power transmission components, and the enclosure functions as a heat sink for the power transmission components;

wherein the thermal conductive bridge comprises thermal conductive ribs protruding from a surface of the inner wall of the enclosure, and a conductor slot configured to mount each of the electric power transmission components is formed between the thermal conductive ribs adjacent to each other;

wherein a gap between the electric power transmission component and the corresponding conductor slot is filled with a cured layer formed by an impregnation liquid after being cured; and wherein a reinforcing material layer is further provided, the reinforcing material layer covers a slot opening of the conductor slot, and the reinforcing material layer is impregnated with the impregnation liquid.

8. The enclosure according to claim 7, wherein the thermal conductive bridge is fixed to the inner wall of the enclosure by a mechanical fixing means, or is pre-formed on the inner wall of the enclosure.

9. The enclosure according to claim 7, wherein each of the electric power transmission components comprises an electric power transmission cable, the thermal conductive bridge has a connecting surface connected to the inner wall of the enclosure and a thermal conductive arc surface configured to mount the electric power transmission cable;

or, the thermal conductive bridge comprises an arc-shaped thermal conductive recess extending from the inner wall of the enclosure.

* * * * *